W. A. TURBAYNE.
ELECTRICAL SYSTEM OF DISTRIBUTION.
APPLICATION FILED FEB. 13, 1909.
941,113.
Patented Nov. 23, 1909.
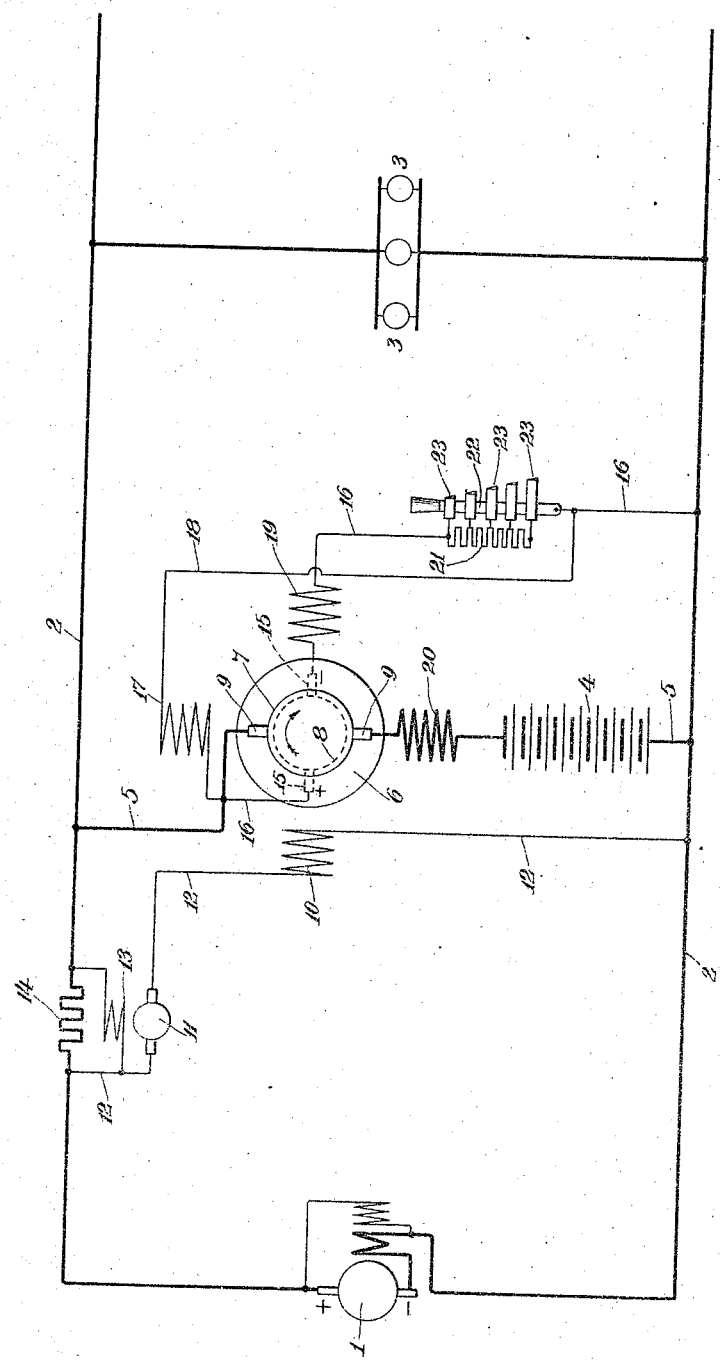
Witnesses:
W. A. Hutton
J. O. Gempler
Inventor
William A Turbayne
By his Attorneys
Kenyon & Kenyon

UNITED STATES PATENT OFFICE.

WILLIAM A. TURBAYNE, OF LANCASTER, NEW YORK, ASSIGNOR TO GOULD COUPLER COMPANY, A CORPORATION OF NEW YORK.

ELECTRICAL SYSTEM OF DISTRIBUTION.

941,113.  Specification of Letters Patent.  Patented Nov. 23, 1909.

Application filed February 13, 1909. Serial No. 477,651.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and apparatus therefor and my improvements are more especially designed to render such systems more economical and efficient in operation and construction.

More particularly my improvements are especially applicable to systems in which a main source of electrical energy supplies a consumption circuit and its load and in which a storage battery and booster are operatively arranged to maintain the load on the main source of electrical energy substantially constant.

One object of my invention is to provide an arrangement or apparatus which is especially economical and efficient and a booster which is provided with field and armature windings so arranged that part of these windings coact to drive the booster and part coact to provide the booster voltage for the purpose of controlling the battery action.

Further objects, advantages and features will more clearly appear from the detailed description given below taken in connection with the accompanying drawing which diagrammatically shows a system and arrangement embodying one form of my invention.

Referring to the drawing, 1 represents a main generator with compound field windings. The main generator 1 forms a source of electrical energy feeding and supplying the consumption circuit 2, 2, and its load 3.

4 represents a storage battery connected across the mains 2, 2, by a circuit 5, 5. In series in the circuit 5, 5, is a booster 6 arranged to produce the proper electromotive force in the circuit 5, 5, to cause the battery to charge or discharge in accordance with the electrical condition of the system.

The booster 6 is provided with two armature windings on the same core structure, which armature windings may be represented by the full line circle 7 and the dotted line circle 8. The windings represented by 7 are connected in series in the booster-battery circuit 5 by means of brushes 9, 9.

10 represents a field coil for the booster which produces a magnetomotive force in the proper direction to produce a flux component which results in an electromotive force being produced at the brushes 9, 9. The field coil 10 is connected in series with a counter electromotive force machine 11 in a circuit 12, 12, 12 connected across the mains or consumption circuit 2, 2. The counter machine 11 is provided with a field coil 13 in shunt to a small resistance 14 in series in the consumption circuit 2.

The parts so far described are so constructed and arranged that when there is a predetermined normal load upon the consumption circuit the current in field coil 13 causes an electromotive force to be produced in the counter machine or exciter 11 just equal to and opposite in direction to the electromotive force applied by the mains 2, 2. Under these conditions, therefore, no current will flow in the field coil 10, and although the booster is being rotated no electromotive force will be produced at the brushes 9, 9, and the battery 4 is allowed to float across the line. When, however, an increased load occurs upon the consumption circuit the field strength of coil 13 is thereby increased, which increases the electromotive force of the counter-machine 11, so that a current is forced through the field coil 10 to excite the same and produce an electromotive force in the booster at the brushes 9, 9 in a direction to cause the battery 4 to discharge and take substantially the increased load. When the load on the system falls below the predetermined normal value the counter-electromotive force of the machine 11 is decreased, thereby allowing current to flow in the field windings 10 in the opposite direction, so that an electromotive force is produced at the brushes 9, 9 in the opposite direction to cause the battery to be charged from the main or consumption circuit 2, 2.

In order to drive the booster and to provide means for this purpose without the use of an additional dynamo-electric machine I provide the armature windings 8 and brushes 15, 15, therefor. The armature windings represented by 8 are connected in the circuit 16, 16, across the line and are arranged to act as motor windings. The flux component for coacting with these windings 8 to produce the motor action is furnished by windings 17 connected across the mains by a conductor 18.

In order that the flux components produced by the field fluxes 17 and 10 may be separate and controllable independently of each other these field coils are displaced from one another at substantially 90 electrical degrees, and accordingly the sets of brushes 9, 9, and 15, 15 are displaced from one another, each set being arranged at 90 electrical degrees from the other set. The field coil 17, therefore, is arranged to coact with the armature windings 8 which are connected across the circuit 2, 2, by brushes 15, so that these field and armature windings coact to produce a motor action which drives the machine in the direction shown by the arrow. The field windings 10 and armature windings 7 coact to produce an electromotive force vectorially displaced at substantially 90 electrical degrees from that applied at the brushes 15, which electromotive force is collected by the booster brushes 9, 9, and controls the battery action. In order that the armature current in the windings 8 may not react to affect the action of the field windings 10, field windings 19 are added in series with the armature windings 8 and so arranged that the armature reaction produced in such windings is compensated for by said windings 19. In a like manner the armature reaction of the armature windings 7 is cut down or compensated for by field windings 20 in series in the battery circuit so that the reaction in the windings 7 produces substantially no effect upon the voltage at the brushes 15, 15. A sectional resistance 21 is included in series with the motor brushes 15 for bringing the machine up to speed. This variable resistance 21 is controlled by a knife switch 22 having a plurality of stepped contacts 23, 23.

From the above it will be apparent that the booster 6 is self-driven in that it is provided with windings which coact to drive the same, and with windings which coact to produce the booster regulating functions, these windings being so arranged that the armature windings for both functions are upon the same armature core and cut the same fields, and the field windings for both functions are upon the same field frame. It is, therefore, unnecessary to use any additional dynamo-electric machine for the purpose of driving the booster and the arrangement is not only exceptionally economical but the regulation of the arrangement is exceptionally efficient.

If it is desired the counter-machine 11 can be dispensed with by simply arranging the field coil 10 to be responsive to variations of load upon the main generator 1 and by arranging a counter-coil in any well known manner such that when there is normal load on the system the effect of the coil 10 and the counter-coil will be *nil*.

Although I have described my invention with respect to a particular system it will be evident that my improvements are equally well adapted to many other systems and arrangements. Therefore, although I have described my invention in great detail I do not desire to be limited by such details, but Having fully and clearly described my invention what I claim as new and desire to secure by Letters Patent, is:

1. A dynamo-electric machine having an armature core structure provided with two sets of windings, one set being motor windings and the other set being generator windings, and independent field windings operatively arranged with respect to each of said sets.

2. A dynamo-electric machine provided with two sets of field windings, and an armature core having windings operatively arranged with respect to one set of field windings for driving the machine and operatively arranged with the other set of field windings for generating an electromotive force.

3. A dynamo-electric machine provided with two sets of field windings, and an armature core structure having one set of armature windings operatively arranged with respect to one set of field windings for driving the machine, and one set of armature windings operatively arranged with respect to the other set of field windings for generating an electromotive force in the machine.

4. A dynamo-electric machine having two independent sets of armature windings on the same core structure, sets of brushes for said windings electrically displaced from each other and field windings for said machine so connected that one set of said armature windings acts to drive the machine and the other set acts to generate an electromotive force.

5. A dynamo-electric machine having two independent sets of armature windings on the same core structure, sets of brushes for said windings electrically displaced from each other and two independent sets of field windings for said machine also electrically displaced with respect to one another and so connected and arranged that one set of field windings and one set of armature windings act to drive the machine and the other set of field windings and set of armature windings act to generate an electromotive force in the machine.

6. A dynamo-electric machine having two independent sets of armature windings, commutators therefor, a separate set of brushes for each winding, said sets of brushes being placed substantially ninety electrical degrees apart, independent field windings for each of said sets of armature windings, said field windings being also arranged substantially ninety electrical degrees apart and connected so that one set of field windings and one set of armature windings act to drive the machine and the other set of windings act to generate an electromotive force in the machine.

7. A dynamo-electric machine having two independent sets of armature windings arranged on the same core structure, commutators therefor, a separate set of brushes for each winding, said sets of brushes being placed substantially ninety electrical degrees apart, a single field frame, independent field windings for each of said sets of armature windings on said field frame, said field windings also being arranged substantially ninety electrical degrees apart and connected so that one set of field windings and one set of armature windings act to drive the machine and the other set of windings act to generate an electromotive force in the machine.

8. A dynamo having a single armature core structure and armature windings thereon, brushes for feeding current to the armature for driving said dynamo, brushes for taking off current generated on said armature, field windings for coacting to drive said dynamo and independent field windings for coacting to produce said electromotive force.

9. A dynamo having a single armature core structure and armature windings thereon, brushes for feeding current to the armature for driving said dynamo, brushes for taking off current generated on said armature field windings for coacting to drive said dynamo and independent field windings for coacting to produce said electromotive force, said field windings being displaced substantially ninety electrical degrees.

10. A dynamo having a single armature core structure and armature windings thereon, brushes for feeding current to the armature for driving said dynamo, brushes for taking off current generated on said armature and field windings for compensating for armature reaction in the armature.

11. A dynamo having a single armature core structure and armature windings thereon, brushes for feeding current to the armature for driving said dynamo, brushes for taking off current generated on said armature field windings for coacting to drive said dynamo and independent field windings for coacting to produce said electromotive force, said field windings being displaced substantially ninety electrical degrees and additional field windings for compensating for armature reaction.

12. A dynamo having a single armature core structure and armature windings thereon, brushes for feeding current to the armature for driving said dynamo, brushes for taking off current generated on said armature, field windings for compensating for the armature reaction due to the driving current fed to the armature and independent field windings for compensating for the armature reaction due to the armature current generated in the armature.

13. A dynamo-electric machine having an armature core structure provided with two sets of windings, one set being motor windings and the other set being generator windings, and independent field windings operatively arranged with respect to each of said sets and additional field windings for cutting down armature reaction in said machine.

14. A dynamo-electric machine provided with two sets of field windings, and an armature core structure having one set of armature windings operatively arranged with respect to one set of field windings for driving the machine, and one set of armature windings operatively arranged with respect to the other set of field windings for generating an electromotive force in the machine and independent field windings for compensating for the armature reaction due to the armature currents in both of said sets of armature windings.

15. A dynamo-electric machine having two independent sets of armature windings, commutators therefor, a separate set of brushes for each winding, said sets of brushes being placed substantially ninety electrical degrees apart, independent field windings for each of said sets of armature windings, said field windings being also arranged substantially ninety electrical degrees apart and connected so that one set of field windings and one set of armature windings act to drive the machine and the other sets of windings act to generate an electromotive force in the machine, and two sets of field windings for compensating for the armature reaction in the machine, one set being in series with the armature windings that coact to drive the machine for compensating for armature reaction due to current therein and the other set being in series with the windings that coact to produce an electromotive force for compensating armature reaction therein.

16. In an electrical system of distribution, a consumption circuit and its load, a battery and booster in operative relation therewith, said booster being provided with a single armature core structure windings thereon for coacting to drive the booster and windings thereon for coacting to produce the booster electromotive force.

17. In an electrical system of distribution, a consumption circui. and its load, a battery and booster in operative relation therewith, said booster being provided with armature and field windings for driving the same and for producing the boosting or crushing electromotive force therein.

18. In an electrical system of distribution, a consumption circuit and its load, a battery and booster in operative relation therewith, said booster being provided with two independent sets of armature windings on a single core structure, field windings therefor, brushes for feeding a current to one set of armature windings to drive the booster and brushes for taking off the current generated in the other set of armature windings.

19. In an electrical system of distribution, a consumption circuit and its load, a battery and booster in operative relation therewith, said booster being provided with two sets of field windings, and an armature core having windings operatively arranged with respect to one set of field windings for driving the machine and operatively arranged with the other set of field windings for producing the booster potential.

20. In an electrical system of distribution, a consumption circuit and its load, a battery and booster in operative relation therewith, said booster having two independent sets of armature windings on the same core structure, sets of brushes for said windings electrically displaced from each other and field windings for said booster, so connected that one set of said armature windings coact to drive the machine and the other set coact to generate the booster electromotive force.

21. In an electrical system of distribution, a consumption circuit and its load, a battery and booster in operative relation therewith, said booster being a dynamo-electric machine having two independent sets of armature windings on the same core structure, sets of brushes for said windings electrically displaced from each other and two independent sets of field windings for said machine also electrically displaced with respect to one another and so connected and arranged that one set of field windings and one set of armature windings act to drive the machine and the other set of field windings and set of armature windings act to generate an electromotive force in the machine.

22. In an electrical system of distribution, a consumption circuit and its load, a battery and booster in operative relation therewith, said booster being a dynamo-electric machine having two independent sets of armature windings, commutators therefor, a separate set of brushes for each winding, said sets of brushes being placed substantially ninety electrical degrees apart, independent field windings for each of said sets of armature windings, said field windings being also arranged substantially ninety electrical degrees apart and connected so that one set of field windings and one set of armature windings act to drive the machine and the other set of windings act to generate the boosting electromotive force in the machine.

23. In an electrical system of distribution, a consumption circuit and its load, a battery and booster in operative relation therewith, said booster being a dynamo having a single armature core structure and armature windings thereon, brushes for feeding current to the armature for driving said dynamo, brushes in the battery circuit for taking off current generated on said armature and field windings for compensating for armature reaction in the armature.

24. In an electrical system of distribution, a consumption circuit and its load, a battery and booster in operative relation therewith, said booster being a dynamo having a single armature core structure and armature windings thereon, brushes for feeding current to the armature for driving said dynamo, brushes in series with the battery for taking off current generated on said armature, field windings for coacting to drive said dynamo and independent field windings for coacting to produce said electromotive force, said field windings being displaced substantially ninety electrical degrees and additional field windings for compensating for armature reaction.

25. In an electrical system of distribution, a consumption circuit and its load, a battery and booster in operative relation therewith, said booster being a dynamo having a single armature core structure and armature windings thereon, brushes for feeding current to the armature for driving said dynamo, brushes in series with the battery for taking off current generated on said armature field windings for compensating for the armature reaction due to the driving current fed to the armature and independent field windings for compensating for the armature reaction due to the armature current generated in the armature.

26. In an electrical system of distribution, a consumption circuit and its load, a battery and booster in operative relation therewith, said booster being a dynamo-electric machine having two independent sets of armature windings, commutators therefor, a separate set of brushes for each winding, said sets of brushes being placed substantially ninety electrical degrees apart, independent field windings for each of said sets of armature windings, said field windings being also arranged substantially ninety electrical degrees apart and connected so that one set of field windings and one set of armature windings act to drive the machine and the other set of windings act to generate an electromotive force in the machine, and two sets of field windings for compensating for the armature reaction in the machine, one set being in series with the armature windings that coact to drive the machine for compensating for armature reaction due to current therein, and the other set being in series with the windings that coact to produce an electromotive force for compensating armature reaction therein.

27. In an electrical system of distribution, a consumption circuit and its load, a storage battery and booster in operative relation thereto, said booster having two sets of armature windings on a single core structure, one of said sets being connected to a source of electromotive force and field windings on the booster arranged to coact with said last mentioned set to drive the booster, and a field coil connected to be responsive to fluctuations of load on said circuit for coacting with the other set of armature windings to produce the booster electromotive force therein.

28. In an electrical system of distribution, a consumption circuit and its load, a storage battery and booster in operative relation thereto, said booster having two sets of armature windings on a single core structure, one of said sets being connected to a source of electromotive force and field windings on the booster arranged to coact with said last mentioned set to drive the booster, and a field coil for coacting with the other set of armature windings to produce the booster electromotive force therein, said field coil being energized by an exciter responsive to load changes on the system.

29. In an electrical system of distribution, a main generator, a consumption circuit and its load supplied thereby, a storage battery connected across said circuit, a booster in series with said battery, said booster having armature windings on a single core structure, two sets of brushes therefor, each set being electrically displaced from the other, two sets of field windings therefor also electrically displaced from one another, one set of field windings being arranged to coact to drive the booster, and the other sets of field windings being arranged to coact to produce the booster potential, said last mentioned set of field windings being connected to receive a current responsive to variations of generator current.

30. In an electrical system of distribution, a main generator, a consumption circuit and its load supplied thereby, a storage battery connected across said circuit, a booster in series with said battery, said booster having two sets of armature windings on a single core structure, two sets of brushes therefor, each set being electrically displaced from the other, two sets of field windings therefor also electrically displaced from one another, one set of field windings and one set of armature windings being arranged to coact to drive the booster, and the other sets of field and armature windings being arranged to coact to produce the booster potential, said last mentioned set of field windings being connected to receive a current responsive to variations of generator current, and two additional sets of field windings on the booster, one set for compensating for armature reaction due to current in one set of armature windings and the other set for compensating for armature reaction due to current in the other set of armature windings.

31. In an electrical system of distribution, a consumption circuit and its load, a storage battery and booster in operative relation thereto, said booster having two sets of armature windings on a single core structure, one of said sets being connected to a source of electromotive force, and field windings on the booster arranged to coact with said last mentioned set to drive the booster, and a field coil for coacting with the other set of armature windings to produce the booster electromotive force therein, said field coil being energized by an exciter responsive to load changes on the system and additional field windings on said booster for compensating for armature reaction.

In testimony whereof, I have signed my name to this specification, in the presence of two subscribing witnesses.

WILLIAM A. TURBAYNE.

Witnesses:
PIERCE ENGLISH,
W. H. PATTENDEN.